UNITED STATES PATENT OFFICE.

FREDERICK KOSKUL, OF PHILADELPHIA, PENNSYLVANIA.

IMPROVEMENT IN DISTEMPER-PAINTS.

Specification forming part of Letters Patent No. 217,388, dated July 8, 1879; application filed June 18, 1879.

*To all whom it may concern:*

Be it known that I, FREDERICK KOSKUL, of the city of Philadelphia, in the county of Philadelphia and State of Pennsylvania, have invented a certain new and useful Compound for Painting, Coating, or Covering Roofs, Walls, or other Surfaces Exposed to Atmospheric Influences; and I do hereby declare that the following is a clear and exact description of the same, which will enable others skilled in the art to which it pertains to make and use it.

To prepare the compound I take ordinary lime and slake it in milk or water; but I prefer to use milk for this purpose. It is then mixed with about an equal quantity of fresh animal-blood, (bullock's blood by preference, if it can be obtained.) The slaked lime and blood are thoroughly stirred and mixed, after which I add an equal quantity—that is, one part—of fresh milk and a small quantity of alum dissolved in water. The compound is then again thoroughly mixed until the whole forms a thick liquid compound, about the consistence of oil-paint, the several ingredients readily amalgamating or mixing together.

If not intended for immediate use, this composition should be kept in sealed cans or air-tight jars, when it will keep in a limpid and fresh condition for years.

If designed for the coating of roofs, weather-boarding, or the hulls of vessels or other surfaces immersed in water, a quantity of sifted ashes or finely-powdered brick-dust may be added, to give more body to the compound and produce a thicker coating with the same amount of composition.

This compound will produce a coating or covering which, when dry and hard, is of a certain elasticity, water-proof, and not affected by moisture, heat, or frost. Hence it is admirably adapted for use on buildings, bridges, or vessels; or, by impregnating canvas, paper, or other fabrics with it, it will produce a material that may be advantageously employed for tents, tarpaulins, or similar articles.

I do not limit myself to the precise proportions herein given, as they may be varied in several ways without materially affecting the result; but,

Having thus described my invention, I claim and desire to secure by Letters Patent of the United States—

The herein-described compound or composition for coating or covering surfaces, composed of slaked lime, animal-blood, milk, and solution of alum, in about the proportions stated, for the purpose set forth.

FREDERICK KOSKUL.

Witnesses:
JOHN R. QUIN,
WM. C. GROSS.